United States Patent
Roither et al.

(10) Patent No.: US 6,879,073 B2
(45) Date of Patent: Apr. 12, 2005

(54) ELECTROMOTIVE LINEAR DRIVE

(75) Inventors: Andreas Roither, Bielefeld (DE); Ralf Bokämper, Lübbecke (DE); Horst Finkëmeyer, Melle (DE); Jürgen Martin, Bünde (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 92 days.

(21) Appl. No.: 10/232,468

(22) Filed: Aug. 30, 2002

(65) Prior Publication Data

US 2003/0006869 A1 Jan. 9, 2003

Related U.S. Application Data

(63) Continuation of application No. PCT/EP01/02887, filed on Mar. 15, 2001.

(30) Foreign Application Priority Data

Mar. 20, 2000 (DE) .......................... 200 05 050

(51) Int. Cl.$^7$ ............................. H02K 5/10; H02K 7/06
(52) U.S. Cl. .............................. 310/89; 310/99; 310/80
(58) Field of Search .............................. 310/88, 89, 99, 310/20, 80

(56) References Cited

U.S. PATENT DOCUMENTS

| 4,081,704 A | * | 3/1978 | Vassos et al. .................. 310/50 |
| 4,858,481 A | | 8/1989 | Abraham |
| 5,623,176 A | | 4/1997 | Brandt, Jr. |
| 5,990,586 A | * | 11/1999 | Milano, Jr. ................ 310/75 R |
| 6,246,191 B1 | * | 6/2001 | Bokamper et al. ............. 318/12 |
| 6,522,036 B1 | * | 2/2003 | Chen ........................... 310/58 |

FOREIGN PATENT DOCUMENTS

| DE | 37 35 370 A | 5/1988 |
| DE | 94 05 297 U | 5/1994 |
| DE | 198 16 388 A | 12/1998 |

* cited by examiner

*Primary Examiner*—Darren Schuberg
*Assistant Examiner*—Judson H. Jones
(74) *Attorney, Agent, or Firm*—Henry M. Feiereisen

(57) ABSTRACT

An electromotive linear drive includes one or more drive motors and a corresponding number of torque-reducing transmissions and corresponding driven spindles and a casing. The casing is comprised of two casing parts, whereby the abutting surfaces of the casing parts are sealed by a sealing element or a plurality of sealing elements. Connecting terminals for mechanical and/or electrical components are provided on the exterior of the casing parts.

41 Claims, 9 Drawing Sheets

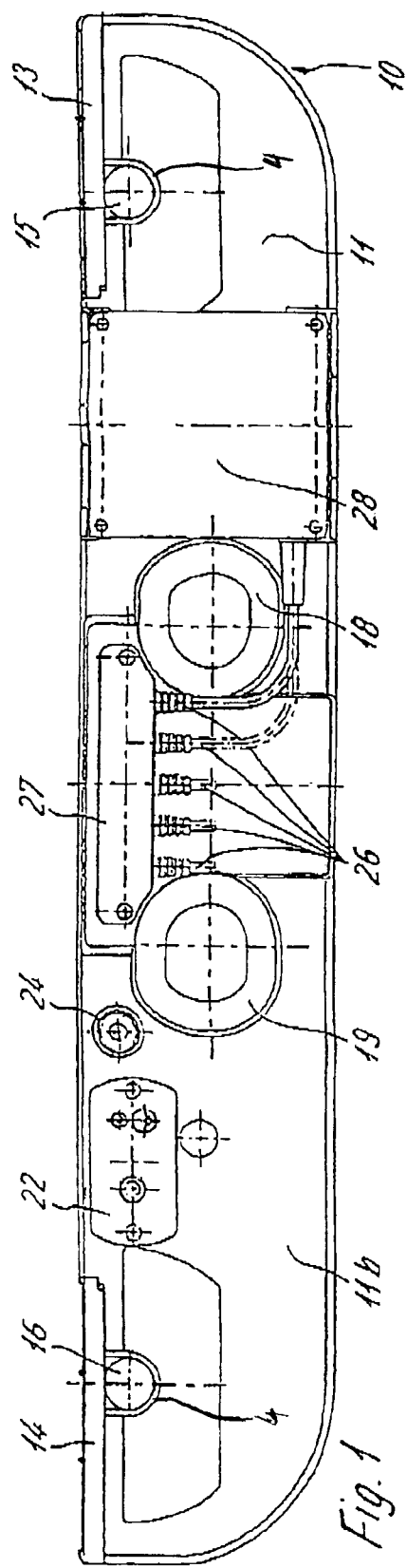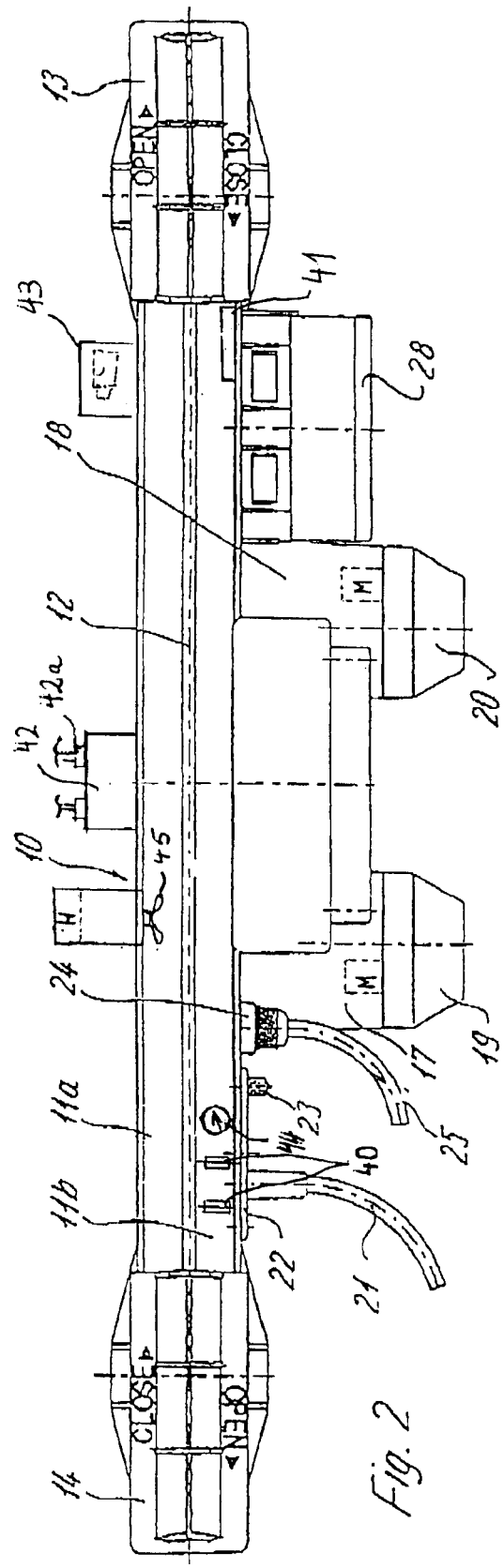

ELECTROMOTIVE LINEAR DRIVE

CROSS-REFERENCES TO RELATED APPLICATIONS

This application is a continuation of prior filed copending PCT International application no. PCT/EP01/02887, filed Mar. 15, 2001.

This application claims the priority of German Patent Application Serial No. 200 05 050.8, filed Mar. 20, 2000, pursuant to 35 U.S.C. 119(a)–(d), the subject matter of which is incorporated herein by reference.

BACKGROUND OF THE INVENTION

The present invention relates, in general, to an electromotive linear drive.

A linear drive of a type involved here is especially intended for operating adjustable components of furniture items, such as a slatted frame, and includes a drive motor, a reduction gear unit and a rotatably driven spindle which supports a spindle nut secured against carrying out a rotation movement and interacting with levers which are mounted in fixed rotative engagement on a shaft of the furniture item. A typical construction of a linear drive includes the arrangement of two d.c. motors which can be separately activated by a handset via a control unit.

Linear drives of this type are not only used in the residential field but increasingly also in hospitals and nursing homes. In these latter areas, the furniture item, e.g., a hospital bed or a nursing bed has to be thoroughly cleaned and disinfected periodically or after a change of patients. Typically, the cleaning process is carried out in a washing plant. It must then be ensured that cleaning liquid is prevented from penetrating into the interior of the casing of the linear drive. In general, the casing is made of two casing parts. Depending on the type of construction, the casing may be box-shaped and closed on the top by a cover, or comprised of two shells, whereby abutting surfaces are disposed in perpendicular relationship, when assembled.

It would be desirable and advantageous to provide an improved electromotive linear drive which obviates prior art shortcomings and which is simple in structure, while reliably preventing ingress of liquid during washing or cleaning operation and allowing connection of additional drives or appliances.

SUMMARY OF THE INVENTION

According to one aspect of the present invention, an electromotive drive includes a casing having at least two casing parts connected to one another to form a butt joint; at least one motor mounted in the casing; a speed reduction gear unit interacting with the motor; a rotating spindle driven by the motor via the reduction gear unit to establish a power train; a cable connectable to a power outlet for providing electric energy to the power train; and a seal which extends completely, or at least substantially coextensive with the butt joint for sealing the butt joint between the casing parts.

The seal may be a flat packing which has a configuration conforming to the contour of the butt joint. In the event a double drive is involved, the end portions are provided with two slides which overlap U-shaped recesses of the casing parts. Engaging the U-shaped recesses in assembled state are the head and foot portions of a slatted frame, whereby the slides secure the linear drive to the furniture item. As the region of the slides is difficult to seal by a separate sealing element, the casing is so configured as to establish a labyrinth-type seal in the area of the slides so that, in fact, a sufficient sealing action is provided.

As an alternative, the seal at the butt joint may also be realized by a sealing compound which is suitably of permanent elasticity.

When using the linear drive according to the present invention in hospitals or nursing homes, versatility is demanded, i.e., the linear drive should be so constructed as to allow connection of additional devices or appliances. Thus, in accordance with the present invention, the casing parts may have formed or mounted thereon external connecting terminals for attachment of mechanical and/or electrical components. In this way, additional drives, preferably single drives, hand switches, control boxes and similar components may be connected to the linear drive. As the possibility is afforded already during fabrication, re-equipment is extremely easy and cost-efficient. In particular when the medical field is involved, the linear drive should be constructed to prevent inadvertent shutdown by a patient. In accordance with the present invention, the linear drive may be equipped with various safety features, such as the provision of an electrical attachment element on the casing-proximal end of the power cord for allowing replacement of the power cord, whereby the attachment element is insertable in a complementary counterpiece of the casing and covered by a mounting element which is detachably connected, suitably by a screw connection, to the casing. Examples of electric attachment elements include also the use of a screwed cable gland. Replacement of the power cord may be required, when, for example, a wire is broken or other devices, connected to the linear drive, should be supplied with electric energy and the power cord is not configured for this purpose. The provision of the mounting element is normally sufficient to prevent the patient form removing the attachment element from the socket. This is true also for those situations in which the connection to the casing is realized by screws, because of the need to use a tool that is normally not available to the patient. A cost-efficient production of the power cord with the mounting element can be realized by a single-piece construction of the mounting element with the power cord, suitably through an injection-molding process. In this way, a loss of the mounting element is precluded. Safety reasons also demand a grounding of the electromotive drive. Thus, in accordance with the present invention, the mounting element is equipped with a ground connection, suitable a screw. This ground connection may be formed during injection-molding of the mounting element so as to avoid additional process steps. It is, however, also possible to connect the end portion of the power cord with the mounting element by means of a cable gland, thereby prevent application of tensile forces on the connection. Such cable glands are also referred to a PG screw connections.

It is also required to secure the electric components of the linear drive by the use of fuses. To date, such fuses have been disposed inside the casing so that a replacement of a defective fuse required a dismantling of the casing. Thus, replacement of fuses was difficult to entertain. In accordance with the present invention, the mounting element is so constructed as to cover the electric fuses, placed in respective sockets, so that it is only necessary to remove the mounting element to provide access to the fuses and to allow replacement thereof, if need be. As an alternative, it is also conceivable to so provide sockets on suitable areas of the casing that the fuses become accessible by respective openings. A panel may be provided to cover the openings.

The casing may be made of plastic through an injection-molding process. In order to afford the option to provide additional switching or control functions via an external cable, for example, through connection of a power switch, the use of at least one screwed cable gland may be provided for engagement in the opening during casing production. Instead of the cable gland, it may also be possible to directly guide the cable therethrough, e.g. through use of a rubber ring. It is also conceivable to associate to the opening a strain relief for the cable.

According to another feature of the present invention, the casing may have at least one compartment to accommodate a re-chargeable accumulator or battery. The accumulator or battery should be insertable from outside in the compartment so as to allow an electric coupling with the drive from outside via a cable, which is suitably attachable from outside. Of course, the provision of integrated contacts may also be possible. In addition to the placement of an accumulator or battery, it is also possible to arrange a transformer, e.g., an electric core transformer or a magnetic core transformer. In particular, when the linear drive is used in the medical field, it may be necessary to provide a disengagement of the drive to allow execution of, e.g., a downwardly directed movement in shortest possible time. This disengagement may be realized by means of a lever or a rope, guided through an opening of the casing. The lever may be a rotary lever or a pivot lever.

Both casing parts, or casing part with lid attached through screw connection, are mutually sealed via a strand-like sealing element. Only the region of the slides is excluded. Overall, the linear drive is thus sealed so that no separation exists between sealed and unsealed areas.

In linear drives involved here, the motors normally project beyond the sidewalls of the casing for material-saving reasons and realization of a compact structure. Thus, in accordance with the present invention, to cover the motors by hoods or caps which suitably latch to the wall of the housing or cylindrical projections. No additional fastening elements, such as screws or the like, are then required. Sealing of the hoods or caps against the casing may be implemented by conventional toroidal sealing rings or O-rings. The hoods and caps are configured to cover only the outer region of the motor and not the entire length thereof so that the remaining part of the motor is positioned in cylindrical portions formed on the casing. Sealing of the fastening panel for the power cord against the drive casing can suitably be realized by a flat packing. Of course permanent-elastic sealing compounds may also be useable.

According to another feature of the present invention, the casing may be provided with further electric attachment elements for placement of complementary plugs which in turn are masked by a safety panel detachably connected to the casing. The plugs are also sealed by sealing elements against the drive casing. Suitably, O-rings are used disposed respectively on the O-rings. Of course, it is also possible to seal the plugs by using sealing compound.

In view of the versatile application and the demand on safety features of an electromotive linear drive according to the present invention, additional aggregates of different type may be added. Accordingly, at least one of the casing parts may have a compartment for receiving at least one electric device in force-fitting engagement and/or form-fitting engagement. The compartment is suitably situated on the exterior of the casing part. The electric device may be supplied with electric energy via current storage or via the current supply of the linear drive. Examples for electric devices involved here may include a device of the entertainment electronics, e.g. a radio, or a safety sensor, e.g. a smoke detector, a humidity detector or similar monitoring sensors.

The linear drive may also be provided with a pocket for receiving a tool box for maintaining the linear drive, and/or a spare part box for storage of wearing parts such as fuses, cables, lighting elements. The pocket may be formed also by the compartment in the absence of the electric device, or may be provided in addition to the compartment. This compartment should, however, be accessible from outside.

The linear drive may also be provided with an insecticide and/or a diagnostic system. Suitably, the drive is equipped with a plug-type diagnostic link for attachment of a test device. The linear drive may further be provided with a terminal for an electric household appliance, e.g. a vacuum cleaner. It is also possible to provide the linear drive with a programming unit which is independent from, i.e. inaccessible to a patient so that programming may be executed only by authorized personnel. As the linear drive is intended also for use in hospitals or nursing homes, it may be provided with a safety device, e.g. a carbon dioxide cartridge or a fire extinguisher. It is also conceivable to provide the linear drive with a container for receiving a disinfectant. Suitably, the container is an atomizer.

Another possibility involves the provision of a speech recognition chip and/or an indication for noise, sounds, or light in the linear drive. In the event the linear drive is operated by an accumulator or battery, it may be equipped with a voltage control to allow timely recharging of the accumulator or replacement of batteries.

Suitably, the linear drive may be provided with an air-circulation device for heat dissipation and an optional heater for drying purposes.

Depending on the use at hand, instead of disposing a seal between the abutting surfaces of the casing parts, it may also be possible to cover the butt joint, at least in the region of the slides, with a sealing tape on both sides of the butt joint. The sealing tape may be an adhesive tape with an adhesive on one side. Of course, the seal may be provided also in such a manner as to extend only upon the region of the abutting surfaces which are associated to the slides.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a side view of an electromotive linear drive according to the present invention in the form of a double drive;

FIG. 2 is a top view of the linear drive of FIG. 1;

DETAILED DESCRIPTION OF PREFERRED EMBODIMENTS

Figure 3:
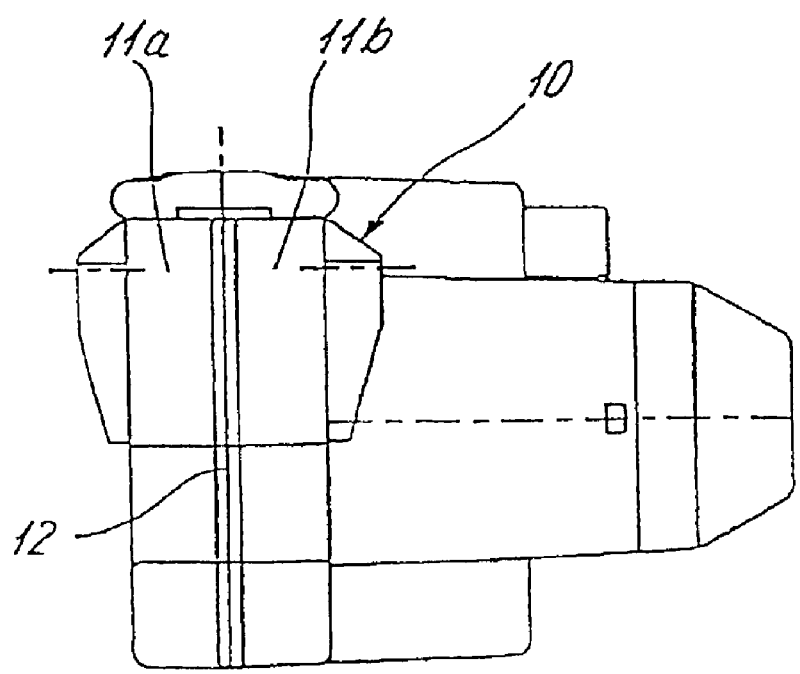
FIG. 3 is a front view of the linear drive of FIG. 1.

Throughout all the Figures, same or corresponding elements are generally indicated by same reference numerals.

Figure 7:
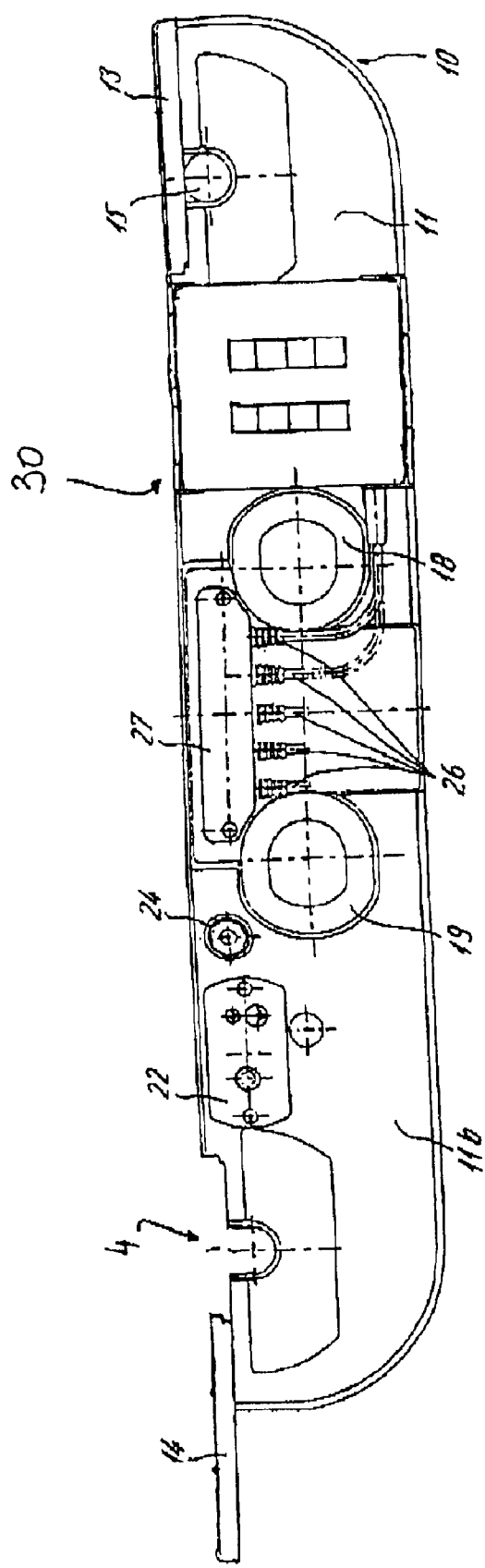
FIG. 7 is a side view of the linear drive with arrangement of a compartment.

Turning now to the drawing, and in particular to FIG. 1, there is shown a side view of an electromotive linear drive according to the present invention, generally designated by reference numeral 10 and illustrated in a position of use. The linear drive 10 has a casing 11 comprised of two casing parts 11a, 11b which are connected to one another such that their abutting surfaces extend vertical. Of course, the casing may also be configured in a manner that one casing part has a box-like shape and the other casing part is a lid. At opposite ends, the linear drive 10 has slides 13, 14 which overlap U-shaped recesses 4 (FIG. 7) in the casing wall, with shafts 15, 16 of a slatted frame (not shown) being accommodated in the U-shaped recesses 4 for suspension of the linear drive 10 to the slatted frame. The slides 13, 14 can be shifted to clear and close access to the recesses 4. The slide 14 is shown in FIG. 7 in open position, while slide 13 occupies the closed position.

Figure 6:
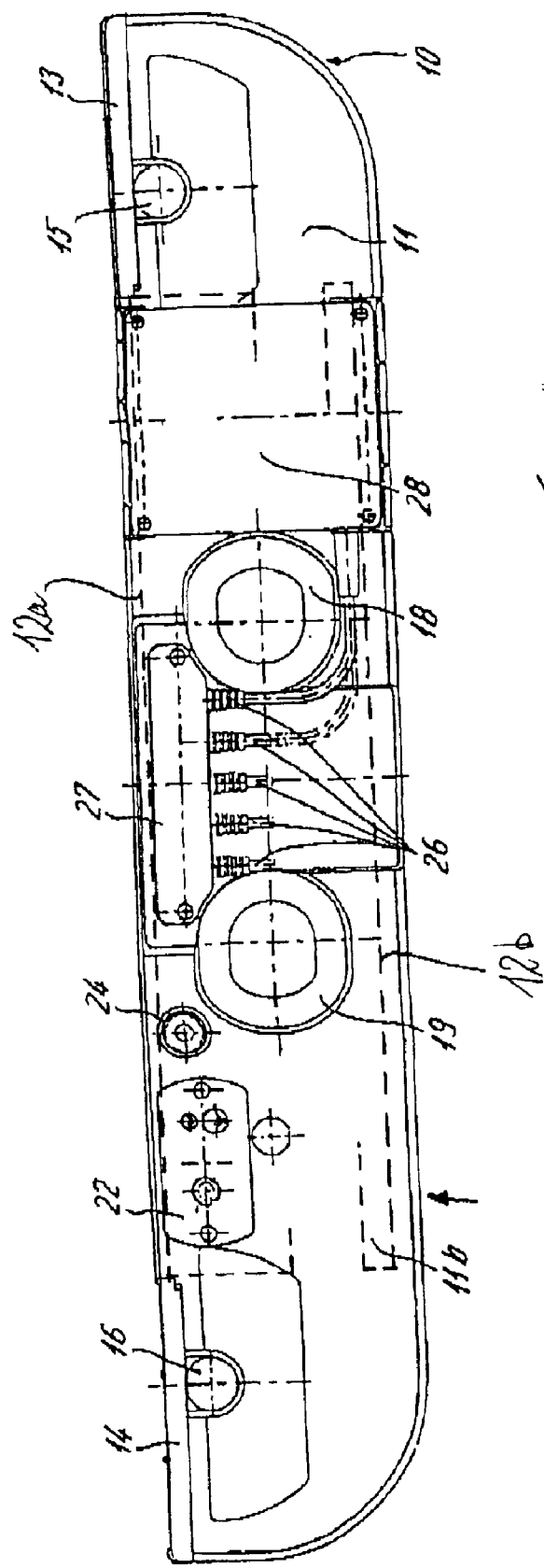
FIG. 6 is a side view of the linear drive with arrangement of a labyrinth-type seal.

The confronting abutting surfaces of the casing 11 are sealed against one another by a sealing element 12. Currently preferable as sealing element 12 is a flat packing. As shown in FIG. 2, the sealing element 12 is wrapped at the butt joint of the casing parts 11a, 11b almost entirely about the casing 11, except for the region of the slides 13, 14, as shown in FIGS. 2 and 3. FIG. 6 shows by way of phantom lines an arrangement of a sealing element in the form of a retracted upper seal 12a and a retracted lower seal 12b, whereby the seals 12a, 12b are configured in the area of the slides 13, 14 to establish a labyrinth-type seal.

Figure 4:
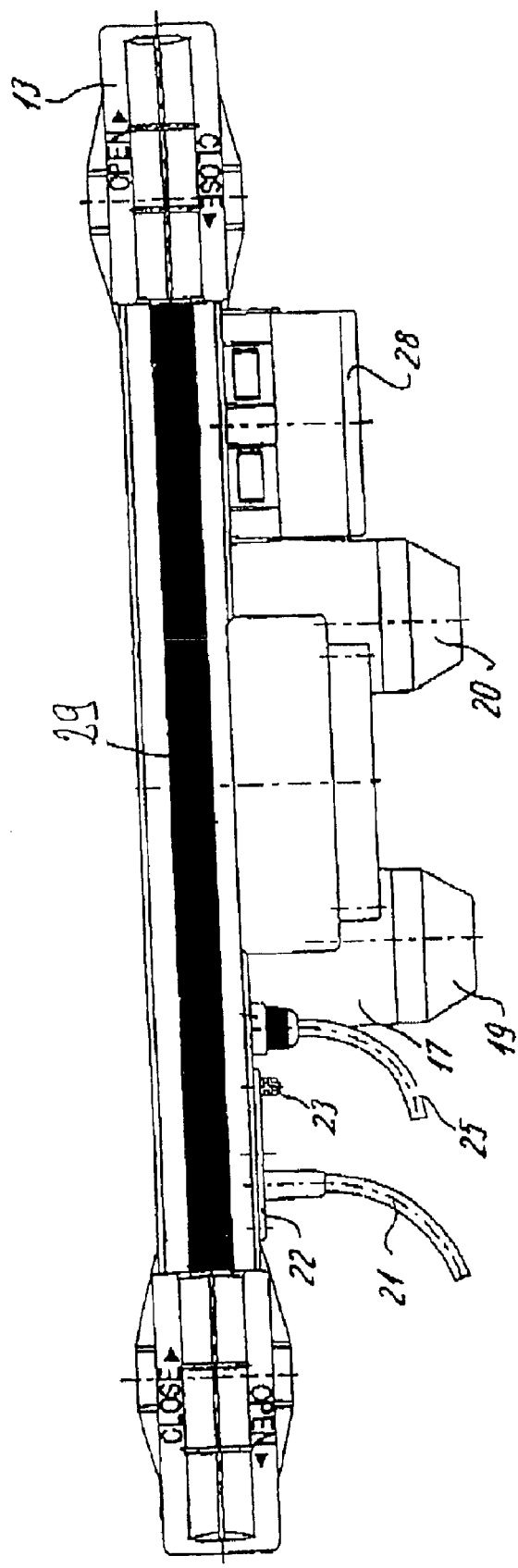
FIG. 4 is a top view of an electromotive linear drive with a seal in the form of a sealing tape.
Figure 5:
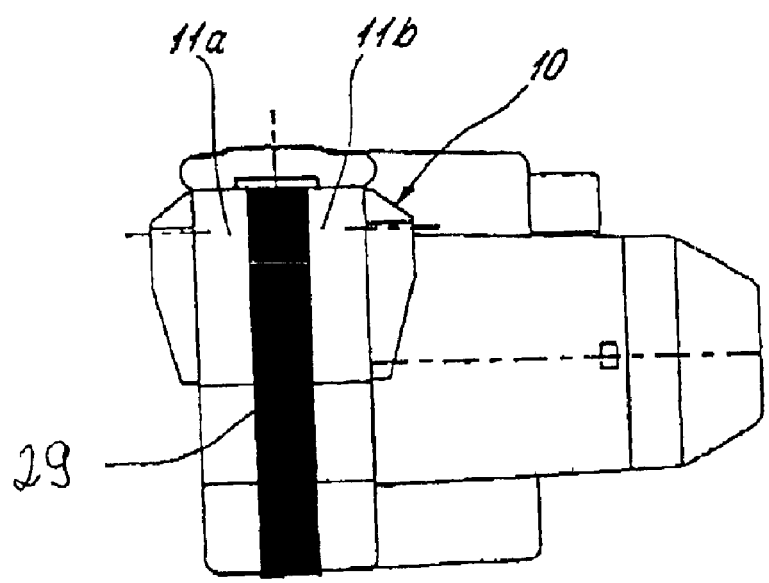
FIG. 5 is a front view of the linear drive of FIG. 4.

In the nonlimiting example of FIGS. 4 and 5, the casing parts 11a, 11b are covered at the butt joint by a sealing strip or sealing tape 29. The sealing strip 29 is applied on the casing parts 11a, 11b, except upon the area of the slides 13, 14 so that the sealing tape 29 cannot interfere with a movement of the slides 13, 14.

Jutting out from the casing part 11b of the casing 11 are two cylindrical projections 17, 18 having open free ends for accommodating two drive motors M, shown only symbolically. The cylindrical projections 17, 18 are closed by end caps 19, 20 through a snap-on connection. This facilitates installation of the motors. Although not shown in detail, the end caps 19, 20 are sealed against the cylindrical projections 17, 18 by O-rings.

It will be appreciated by persons skilled in the art that the linear drive 10 must contain much mechanical apparatus which does not appear in the foregoing Figures, e.g., a reduction gear unit, driven by the electric motor, and a rotatably driven spindle which supports a spindle nut. For safety reasons, the drive motors are DC motors which are supplied with a safety voltage. The reduction gear unit is normally a worm gearing as the speed ratio of the rotor of the drive motor must be very high compared to the speed of the spindle. Therefore, the linearly moving spindle nut travels at an extremely low velocity. However, this apparatus, like much other necessary apparatus, is not part of the invention, and has been omitted from the Figures for the sake of simplicity.

Figure 10:
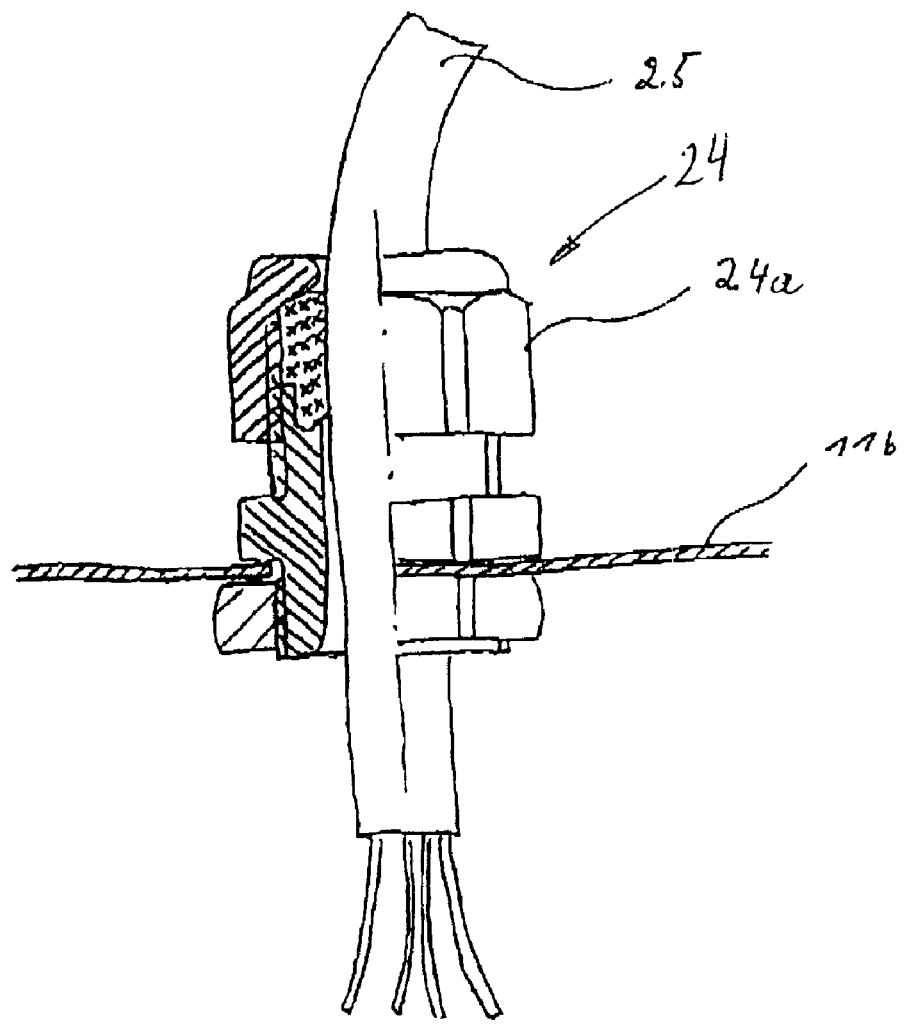
FIG. 10 is a schematic, partial sectional view of a cable gland.

As shown in FIGS. 1 and 2, the casing part 11b is further provided with additional connection terminals for mechanical and electrical components. Of course, the arrangement of the projections 17, 18 and further connection terminals may be formed on the casing part 11a as well instead of casing part 11b. On the left hand end region, the linear drive 10 has a connection for a power cord 21. The power chord 21 has attached thereon through an injection molding process a mounting element 22 which can be bolted to the casing part 11b and is formed with a grounding screw 23. The power chord 21 is provided on its casing-distal end with a plug (not shown) for insertion in a suitable outlet. The casing part 11b is formed immediately next to the mounting element 22 with an opening for accommodating a screwed cable gland 24 to provide a connection for a cable 25. An exemplified cable gland 24 is shown in FIG. 10 and depicts a clamping of the cable 25 by a tightened nut 24a. The cable gland 24 also provides a sealing function and a strain relief to prevent a force to act on the connections of the cable wires.

Formed next to the cable gland 24 are five sockets 5 for attachment of five plugs 26 of cables. The sockets 5 are covered by a safety plate 27 which can be bolted to the casing wall 11b. As shown by way of example in FIG. 1, the sockets 5 are positioned between the cylindrical projections 17, 18 for the motors.

Located directly adjacent the cylindrical projection 18, there is provided at least one compartment 30 (FIG. 7) for accommodating an accumulator or battery for electric connection with the drive via a cable or integrated contacts. A cover 28 can be bolted to the casing part 11b for closing the compartment 30. As shown in particular in FIG. 2, the compartment 30 juts out from the casing part 11b. The compartment 30 may also be used for storage purposes, e.g., for accommodating electrical devices, such as transformer, e.g., an electric core transformer or a magnetic core transformer, an insect killing device, safety box, including fuses 40 or the like, air-circulation device 45, such as a fan, for cooling internal parts of the linear drive 10 so as to prevent overheating. An insect killing device is typically a device for plugging into a power outlet and includes resistance wires that glow to attract insects. The linear drive 10 may also include a heater H for drying purposes in combination with the air-circulation device 45.

Although not shown in detail, the plugs 26 and the plug of the power cord 21 may be sealed by O-rings or by a permanently elastic sealing compound.

Figure 8:
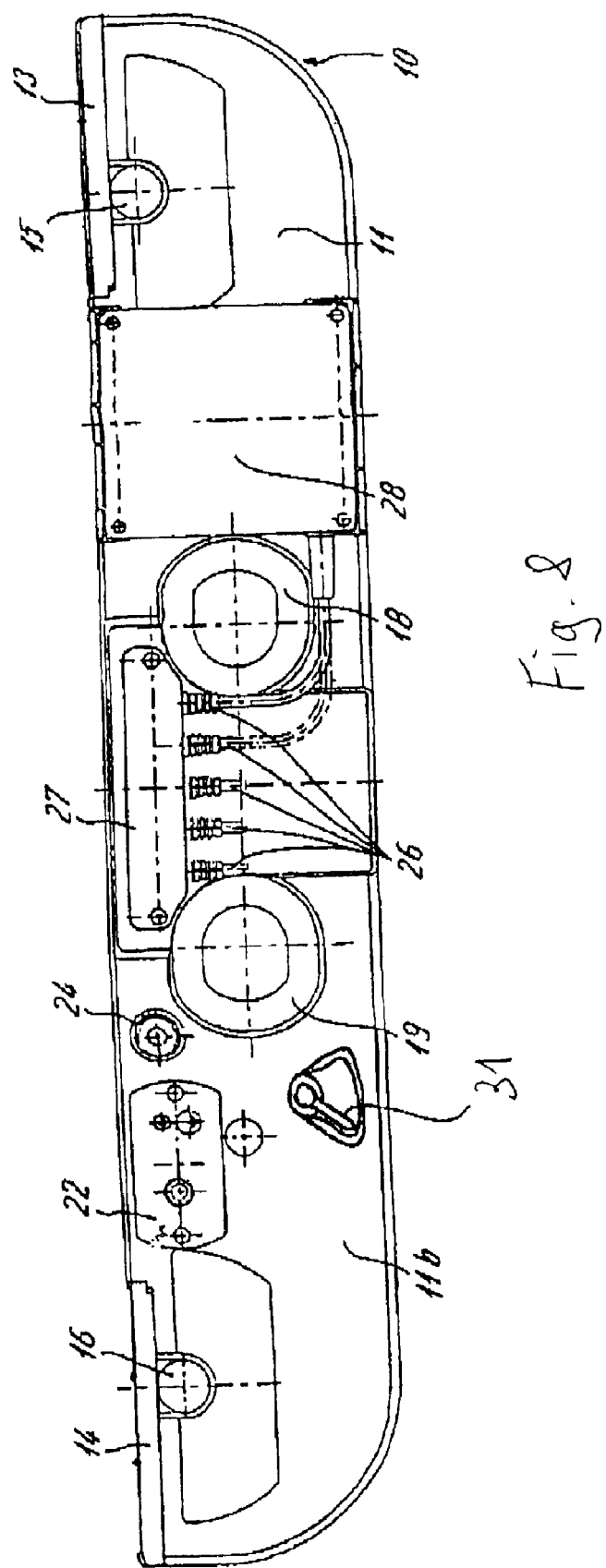
FIG. 8 is a side view of the linear drive with arrangement of a lever for disengagement of the power train.

In particular, when the linear drive 10 is used in the medical field, it may be necessary to provide a disengagement of the power train of the drive to allow execution of, e.g., a downwardly directed movement in shortest possible time. As shown in FIG. 8, the disengagement may be realized by means of a lever 31 in the form of a rotary lever or a pivot lever, which can be switched between two positions.

Figure 9:
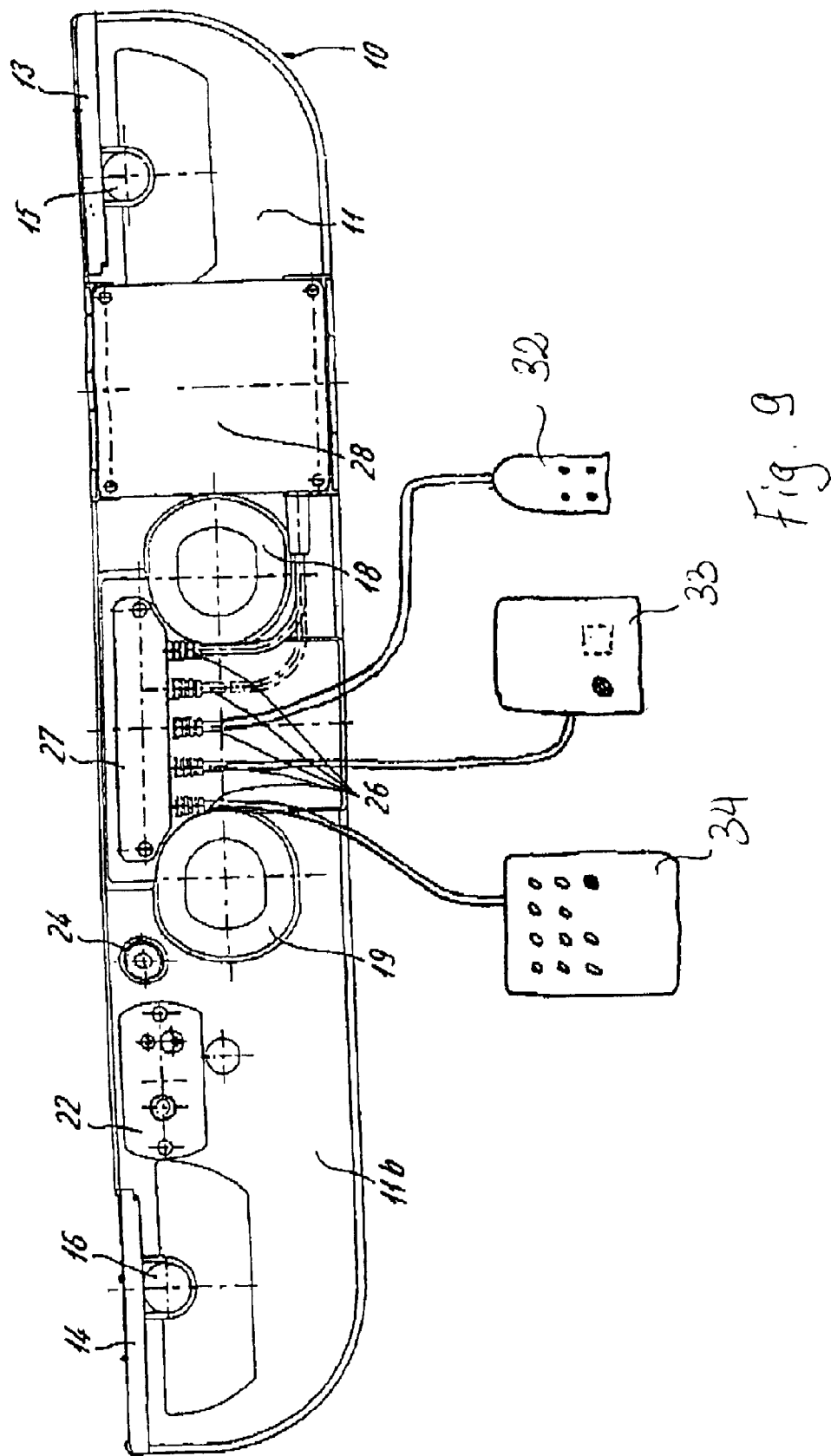
FIG. 9 is a side view of the linear drive with arrangement of a speech recognition system.

It is also possible to equip the linear drive 10 with a speech recognition system and/or an indication for noise, sounds, or light in the linear drive 10. FIG. 9 shows by way of example, the incorporation of a speech recognition system including an inter speech chip which can be controlled by a hand switch 32 or via a microphone 33 in order to operate the linear drive 10. In addition, the linear drive 10 may be equipped with a programming unit 34, when the linear drive 10 is used in hospitals or nursing homes, to bar a patient for executing certain operations. The linear drive 10 may also be provided with an insecticide 41, provided on at least one of the casing parts 11a, 11b, (here casing part 11b), and/or a diagnostic system 42. The diagnostic system 42 includes a plug-type diagnostic link 42a for attachment of a test device. The linear drive 10 may also include a container 43 for receiving a disinfectant. Suitably, the container 43 is an atomizer.

In the event the linear drive 10 is operated by an accumulator or battery, it may be equipped with a voltage control 44 (FIG.2) to allow timely recharging of the accumulator or replacement of batteries.

While the invention has been illustrated and described as embodied in an electromotive linear drive, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An electromotive drive, comprising:
    a casing having at least two casing parts connected to one another to form a butt joint, said casing having end portions provided with U-shaped recesses for securement of the linear drive;
    a pair of slides movably attached to the casing, with one slide covering one of the recesses and the other slide covering the other one of the recesses;
    at least one motor mounted in the casing;
    a power cord connectable to a power outlet for providing electric energy to the motor; and
    a seal substantially extending coextensive with the butt joint, except in an area of the U-shaped recesses, for sealing the butt joint between the casing parts.

2. The linear drive of claim 1, wherein the casing is constructed to form a labyrinth seal in the area of the slides.

3. The linear drive of claim 1, and further comprising connecting terminals, placed externally to the casing parts, for attachment of at least one of mechanical and electrical components.

4. The linear drive of claim 1, wherein the power cord has a casing-proximal end which supports an exchangeable electrical attachment element, and further comprising a mounting member which covers the attachment element and is detachably secured to the casing.

5. The linear drive of claim 4, wherein the attachment element is a plug or a cable gland.

6. The linear drive of claim 4, wherein the mounting member is detachably secured to the casing by a screw connection.

7. The linear drive of claim 4, wherein the mounting member is constructed in one piece with the power cord.

8. The linear drive of claim 4, wherein the mounting member is molded around the power cord.

9. The linear drive of claim 4, wherein the mounting member has a grounding terminal.

10. The linear drive of claim 9, wherein the ground terminal is a grounding screw.

11. The linear drive of claim 4, wherein the casing-proximal end of the power cord is connected to the mounting member by a cable gland.

12. The linear drive of claim 4, and further comprising electric safety fuses covered by the mounting member so that a removal of the mounting member allows replacement of the safety fuses.

13. The linear drive of claim 1, wherein at least one of the casing parts has at least one opening for receiving a cable and/or cable gland and, optionally, a strain relief.

14. The linear drive of claim 1, wherein at least one of the casing parts has at least one compartment for receiving an accumulator or battery for electric connection with the drive via a cable or integrated contacts.

15. The linear drive of claim 1, wherein at least one of the casing parts has a compartment for receiving a transformer.

16. The linear drive of claim 15, wherein the transformer is an electric core transformer or a magnetic core transformer.

17. The linear drive of claim 1, wherein at least one of the casing parts has a compartment for receiving at least one electric device in force-fitting engagement and/or form-fitting engagement.

18. The linear drive of claim 17, wherein the electric device is a device of the entertainment electronics and/or a safety sensor.

19. The linear drive of claim 1, wherein at least one of the casing parts has a compartment for receiving at least one of tool box, spare part box, and service box.

20. The linear drive of claim 1, wherein at least one of the casing parts is provided with an insecticide.

21. The linear drive of claim 1, provided with a diagnostic system.

22. The linear drive of claim 21, wherein the diagnostic system includes a plug-type diagnostic link for attachment of a test device.

23. The linear drive of claim 1, provided with a terminal for an electric household appliance.

24. The linear drive of claim 23, wherein the household appliance is a vacuum cleaner.

25. The linear drive of claim 1, provided with a programming unit which is independent from a patient.

26. The linear drive of claim 1, provided with a safety device.

27. The linear drive of claim 26, wherein the safety device is a carbon dioxide cartridge and a fire extinguisher.

28. The linear drive of claim 1, provided with a container for receiving a disinfectant.

29. The linear drive of claim 28, wherein the container is an atomizer.

30. The linear drive of claim 1, provided with a speech recognition chip and/or a indication for noise, sounds, or light.

31. The linear drive of claim 14, and further comprising a voltage control, when operating with the accumulator or battery.

32. The linear drive of claim 1, provided with at least one of an air-circulation device for heat dissipation and a heater for drying purposes.

33. The linear drive of claim 1, wherein at least one of the casing parts has an opening for passage of a lever or rope to disengage a supply of electric energy to the motor.

34. The linear drive of claim 1, wherein the seal is a toroidal sealing ring.

35. The linear drive of claim 1, wherein the seal is a sealing strip which overlaps the butt joint.

36. The linear drive of claim 35, wherein the sealing strip is a sealing tape.

37. The linear drive of claim 1, wherein at least one of the casing parts has outwardly directed projections which have one casing-distal open end, and further comprising snap-on end caps for sealingly covering the open end of the projections by O-rings or adhesive compound.

38. The linear drive of claim 1, wherein the mounting member for the power cord is sealed against the casing by a flat packing.

39. The linear drive of claim 1, wherein the electric attachment member is sealed against the casing by a seal.

40. The linear drive of claim 1, wherein the seal is an O ring or a plastic sealing compound.

41. The linear drive of claim 3, and further comprising a safety cover for covering the terminals.

* * * * *

UNITED STATES PATENT AND TRADEMARK OFFICE
CERTIFICATE OF CORRECTION

PATENT NO. : 6,879,073 B2
DATED : April 12, 2005
INVENTOR(S) : Andreas Roither et al.

It is certified that error appears in the above-identified patent and that said Letters Patent is hereby corrected as shown below:

<u>Title page,</u>
Item [75], Inventors, change third inventor's last name to -- Finkemeyer --.

Signed and Sealed this

Twenty-seventh Day of September, 2005

JON W. DUDAS
*Director of the United States Patent and Trademark Office*